Feb. 19, 1957 G. BADALINI 2,781,639
FRONT PLATE FOR A FLUID TRANSMISSION COMPRISING MEMBERS FOR
DISTRIBUTING AND ADJUSTING THE PRESSURE IN THE CIRCUIT
Filed April 20, 1954
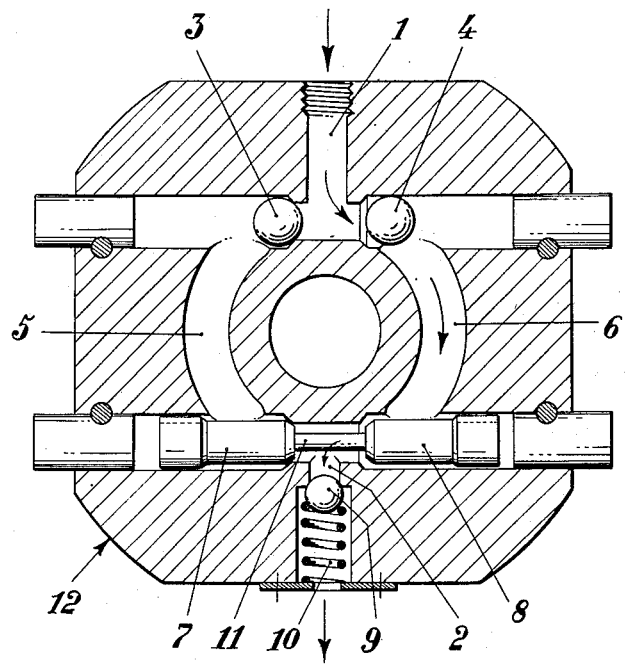
INVENTOR.
GIOVANNI BADALINI

United States Patent Office 2,781,639
Patented Feb. 19, 1957

2,781,639

FRONT PLATE FOR A FLUID TRANSMISSION COMPRISING MEMBERS FOR DISTRIBUTING AND ADJUSTING THE PRESSURE IN THE CIRCUIT

Giovanni Badalini, Rome, Italy, assignor to Cambi Idraulici Badalini S. p. A., Rome, Italy, an Italian company Application April 20, 1954, Serial No. 424,482

Claims priority, application Italy March 8, 1954

2 Claims. (Cl. 60—53)

The present invention relates to a front plate for a fluid transmission, comprising members for distributing and adjusting the pressure in the circuit, which can be applied to the pumps and to the volumetric engines of the continuous speed change devices of hydraulic type.

The purpose of this invention is that of allowing, by a system of valves, supplemental liquid to be sent into the circuit of the fluid transmission for preventing the formation of air bubbles in said circuit, in those parts where the pressure is lower and for causing the pistons to return, at the suction side of the pump.

Another purpose of this invention is that to allow the outflow of excess liquid from the circuit of the fluid transmission, so as to keep the pressure at the desired value, contributing thus to a cooling of the circuit.

Still another purpose of this invention is to allow supplemental liquid to be sent into the circuit of the fluid transmission, said liquid being caused to enter that portion of the circuit which is at a lower pressure in respect to the remaining portion.

Said purposes are secured by a system of valves provided in the body of the distributing front plate, so that the liquid delivered by the supplemental pump opens, due to its own pressure, the valve for communication with the distributing port which is at a lower pressure, but does not open the valve for communication with the distributing port which is at a higher pressure; said liquid flows then through a second valve which is kept opened by the action of the pressure existing in the port where a higher pressure is present and is discharged through a valve where its overpressure overcomes the resistance of a gauged spring opposing the opening of said valve.

One preferred form of embodiment of this invention is shown in the attached drawing, wherein the single figure shows a cross-section of a distributing plate comprising the group of valves.

With reference to the drawing, the circular openings 5 and 6 are the distributing ports provided in the distributing front plate 12 of a device with rotary pistons. According to the revolution direction of the device and according to its operation, i. e. as driving engine or driven member, a greater pressure will be present either at the port 5 or at the port 6. The liquid delivered by the supplemental pump is to be admitted to that portion of the circuit which is at a lower pressure. Said liquid reaches the duct 1, which is in communication with one end of the two ports, with a pressure $p$ greater than the pressure $p_1$ present in that portion of the circuit which is at a lower pressure, but lower than the pressure $p_2$ present in that portion of the circuit where a greater pressure is present. The thrust produced by the pressure on the surrounding surfaces will cause either the valve 3 or the valve 4 to be opened, according to whether a pressure lower than the pressure $p$ is present downstream the first or the second valve. The valve downstream which presents a greater pressure is, on the contrary, kept closed by the same pressure. The figure shows the case wherein the lower pressure is present in the port 6.

Said valves 3 and 4 according to the preferred form of embodiment shown in the figure, can be of the ball type.

At the other end of the two ports 5 and 6 are placed the valves 7 and 8 whose opening or closing are so controlled that the closure of one of said valves is not allowed without the simultaneous and timed opening of the other valve; the device as shown in the figure comprises two piston valves rigidly connected by a bolt 11.

Between the ports of the two valves there is a discharge duct 2, in which is a ball valve or the like 9, whose opening is caused by the pressure of the liquid, if it is greater than the resistance of the gauged spring 10.

The liquid which, for instance, is in the port 5, with a pressure $p_1$ greater than the pressure $p$ of the liquid delivered by the supplemental pump, causes the valve 7 to be closed with the consequent opening of the valve 8, through which flows the liquid delivered by the supplemental pump at a pressure $p$, which entered the port 6, after the valve 4 was opened. The liquid passing the valve 8 enters the duct 2 wherefrom it is discharged or not according to its pressure being able to overcome the resistance of the gauged spring 10 of the valve 9; said discharge of the liquid, besides setting again the desired pressure of the supplemental pump (determined by the gauge of the spring 10) provides for the removal of the heat produced in the circuit.

I claim:

1. In combination, a valve plate having ports connecting the supply and return lines between driving and driven ends of a fluid transmission, the lines being interchangeable as to supply and return, said valve plate having an inlet duct leading from a supplemental pump and a discharge duct having a branch leading to each port, a one-way valve in said discharge duct adapted to be opened to exhaust under a predetermined pressure, one-way valve means between said inlet duct and each of said ports to admit pressure from said inlet duct to said ports, and valve means in each branch between each of said ports and said discharge duct adapted to be closed by pressure in said ports, said valve means being rigidly connected to each other, whereby when one is closed the other is held open.

2. In combination, a valve plate having ports connecting the supply and return lines between driving and driven ends of a fluid transmission, the lines being interchangeable as to supply and return, said valve plate having an inlet duct leading from a supplemental pump and a discharge duct, each duct having branches to each of said ports, a one-way spring loaded valve in said discharge duct adapted to be opened to exhaust under a predetermined pressure, a one-way ball valve in the branch between said inlet duct and each of said ports to admit pressure from said inlet duct to said ports, and piston valves in the branch between each of said ports and said discharge duct adapted to be closed by pressure in said ports, and a rigid connecting member between said piston valves, whereby when one piston valve is closed the other is held open.

References Cited in the file of this patent

UNITED STATES PATENTS

| | | |
|---|---|---|
| 1,212,655 | Magie et al. | Jan. 16, 1917 |
| 1,308,844 | Ferris et al. | July 8, 1919 |
| 1,539,616 | Williams | May 26, 1925 |
| 1,612,925 | Ingoldby | Jan. 4, 1927 |
| 1,840,872 | Rayburn | Jan. 12, 1932 |
| 2,226,481 | Rose | Dec. 24, 1940 |
| 2,657,533 | Schanzlin et al. | Nov. 3, 1953 |
| 2,662,375 | Postel et al. | Dec. 15, 1953 |